United States Patent [19]

Stillwagon

[11] Patent Number: 4,714,340
[45] Date of Patent: Dec. 22, 1987

[54] METHOD AND APPARATUS FOR INSPECTING HIGH SPEED CONVERTED WEB

[76] Inventor: W. C. Stillwagon, 7610 Bell Mill Rd., Dunwoody, Ga. 30338

[21] Appl. No.: 18,597

[22] Filed: Feb. 25, 1987

Related U.S. Application Data

[63] Continuation of Ser. No. 674,098, Nov. 23, 1984, abandoned.

[51] Int. Cl.[4] ............................................. G01P 3/40
[52] U.S. Cl. ...................................... 356/23; 356/430
[58] Field of Search .................................. 356/23–24, 356/429–431, 398, 238; 250/563

[56] References Cited

U.S. PATENT DOCUMENTS

| | | | |
|---|---|---|---|
| 2,355,465 | 8/1944 | Oberkirt | 356/23 |
| 2,497,675 | 2/1950 | Kornei | 356/23 |
| 2,773,990 | 12/1956 | Polhemus et al. | 356/23 |
| 3,535,535 | 10/1970 | Nash | 356/430 |
| 3,589,816 | 6/1971 | Susaya | 356/238 |
| 3,593,087 | 7/1971 | Saiger et al. | 356/23 |
| 3,626,680 | 12/1971 | Whitney | 250/563 |
| 3,761,177 | 9/1973 | Covse | 356/23 |
| 4,075,498 | 2/1978 | Takasuku et al. | 356/238 |
| 4,225,227 | 9/1980 | Seitz | 356/23 |
| 4,389,575 | 6/1983 | Cole | 356/430 |

*Primary Examiner*—R. A. Rosenberger
*Assistant Examiner*—Crystal D. Cooper
*Attorney, Agent, or Firm*—Needle & Rosenberg

[57] ABSTRACT

Printed webs leaving a printing press at speeds above 500 feet per minute are inspected with precision across the full width of the web by a stroboscope method and apparatus. Each repetitive image or design imprinted on the high speed web is rendered stationary relative to the eyes of a viewer at a web inspection station by bright short flashes of light emitted by an elongated xenon flash tube or tubes spanning the web transversely of its path of movement. Filtered light flashes are triggered by an improved strobe circuit which is synchronized with the press at all times and permits an inspector to produce from one to six equally spaced images per press cylinder revolution. Additionally, the system can be used in either an image lock mode for side-by-side comparison with a standard or in a controlled pan or scroll mode to allow optimal inspection of entire impression sequences. Also, when desirable, both sides of the web can be inspected by utilizing a second flash tube configuration located behind the web.

19 Claims, 4 Drawing Figures

METHOD AND APPARATUS FOR INSPECTING HIGH SPEED CONVERTED WEB

BACKGROUND OF THE INVENTION

This application is a continuation of Ser. No. 674098 filed 11/23/84, now abandoned.

At high speeds, greater than 500 feet per minute (fpm), no known method or device exists which will reliably allow an operator to visually inspect the total product for conformity to a standard and to discover defects which sometimes occur in the printing process. Products requiring such inspection while traveling at high speeds include variously printed and coated webs, and continuous motion folding and closing operations. Currently used inspection systems employ a secondary media, such as revolving mirrors or cathode ray tubes, which significantly dilute inspection efficiency.

Inspection systems which employ "spot" strobe lights are inadequate because of an unduly limited viewing area. Spot strobe light inspection systems are timed to provide a fixed or locked image and do not provide a pan or scroll mode whereby the operator can view images across an entire web under the optical illusion that the images are moving slowly through the field of view.

Revolving mirror devices, because of physical limitations, must operate parallel to web direction of movement and are realistically limited to web speeds of 500 fpm and below. Functional limitations preclude observing the web at 90° to its direction of travel and thus preventing the inspection of short repeats, typically under 5 inches.

Because of the above and other limitations in the prior art, there is a need for a more efficient, convenient and practical method and apparatus for visually inspecting high speed printed webs and the like, and the broad objective of this invention is to satisfy that need in a comparatively simple and economical manner.

SUMMARY OF THE INVENTION

A high speed web inspection method and apparatus according to the present invention employs a linear quartz xenon flash tube or tubes of sufficient length to span an entire moving web transversely. A custom design control circuit operates in conjunction with a high voltage power supply circuit to fire the xenon flash tube or tubes. A pulse frequency divider in the form of a print-counter circuit receives a pulse signal output from a signal summer which synchronizes the output of a signal oscillator with the output of a signal encoder connected to an impression cylinder carrying the web. The output frequency is selectively varied depending upon whether a fixed or panned inspection mode is desired. The output of the pulse divider is coupled to a signal driver circuit which supplies trigger pulses to the flash tube assembly which may include flash tubes on both sides of the web. This enables the images on the moving web not only to be frozen or locked stationary at the viewing or inspection station under the well-known stroboscopic effect, but also can be operated in a pan or scroll mode to create the optical illusion of slow movement of the printed image at the inspection station so that the operator can visually inspect the web across its full width to discover defects in the images or to compare them with a standard. Additionally, the invention also provides filtering of the light across the web which enhances the inspection procedure by permitting the discernment of features not readily visible under white light. An oblique light incidence angle on the web substantially eliminates viewer glare. Image synchronized viewing is rendered possible with a line of light transverse to the direction of web travel or parallel thereto, if desired. A large area of illumination (compared to spot strobes) allows more casual viewing by an operator.

Other features and advantages of the invention will become apparent to those skilled in the art during the course of the following description.

DETAILED DESCRIPTION

Figure 1:
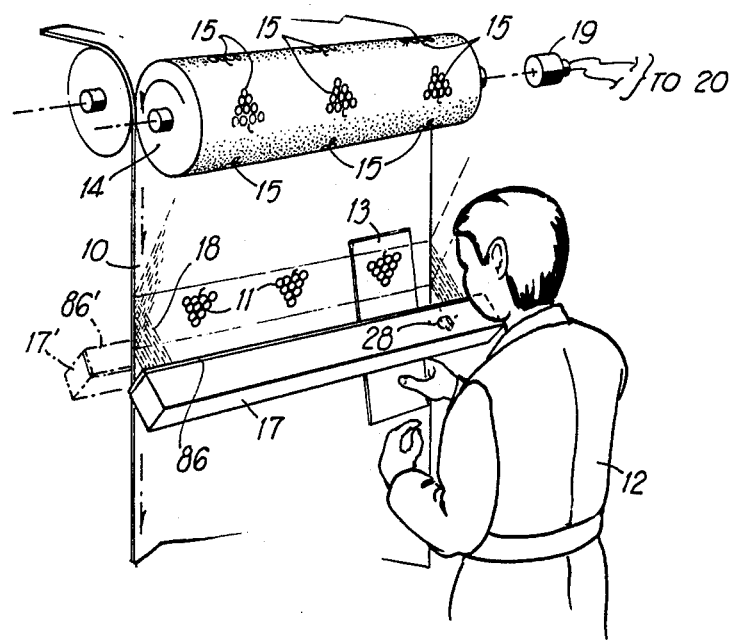
FIG. 1 is a perspective view of a high speed web inspection method and apparatus according to the invention, parts omitted.

Referring to the drawings in detail wherein like numerals designate like parts, a printed web 10 having longitudinally spaced images 11 imprinted thereon travels at high speed, in excess of 500 fpm, through an inspection station, FIG. 1, where an operator 12 visually inspects the printed web for possible defects and also compares the printed images 11 with a standard 13 which may be hand held adjacent to the moving web 10.

The printing press which produces the images or impressions 11 on the web includes an impression cylinder 14 driven conventionally at the required speed. This impression cylinder carries any desired number of impression elements 15 in circumferentially equidistantly spaced relationship on its periphery. These impression elements establish the transverse and longitudinal spacing of the images 11 on the web 10. Six impression elements 15 are shown on the impression cylinder 14 in FIG. 2. In some cases, three, four or five equidistantly spaced impression elements can be employed.

At least one, but preferably two, quartz xenon flash or strobe tubes 16 are located in end-to-end relationship, in an elongated rectangular housing 17, suitably mounted in front of or near the plane of the web 10 and extending transversely of the web at right angles to its direction of travel. The width of the printed web determines the necessity for using one, two or more straight elongated quartz xenon flash tubes 16 in the apparatus. Ideally, the flash tube housing 17 is mounted at an oblique angle of 10° to the path of movement of the web 10, but when desirable, can be at an angle of 90°. This has the effect of drastically reducing glare produced by impingement of the strobe light beam 18 on the surface of the moving web. When inspection of the rear side of the web 10 is desired, another identical tube housing 17' is situated in a like manner behind the web 10.

Figure 3A:
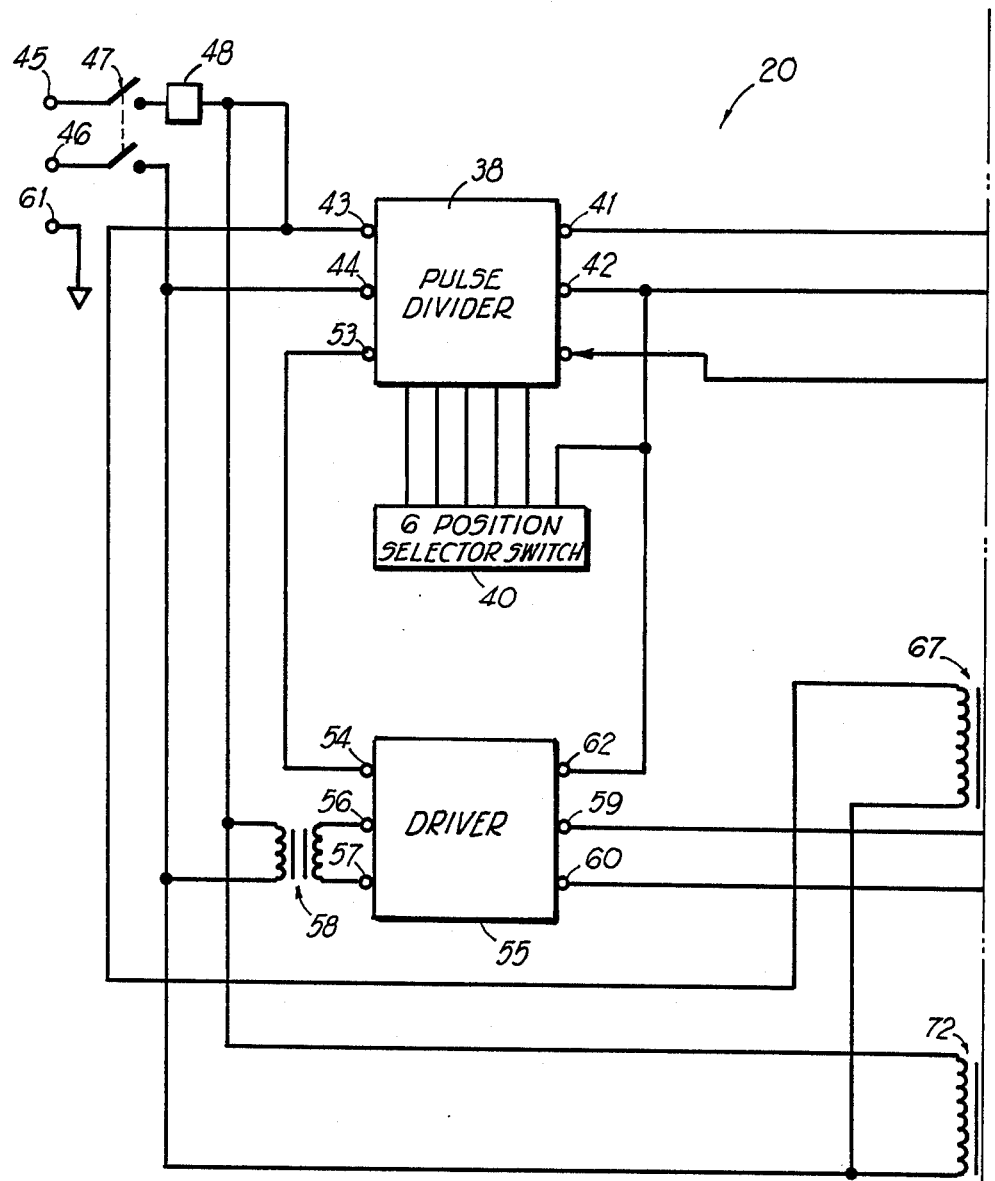
FIG. 3, comprised of sections 3A and 3B, depicts a power supply and control circuit for the linear xenon strobe flash tubes employed in the invention.
Figure 3B:
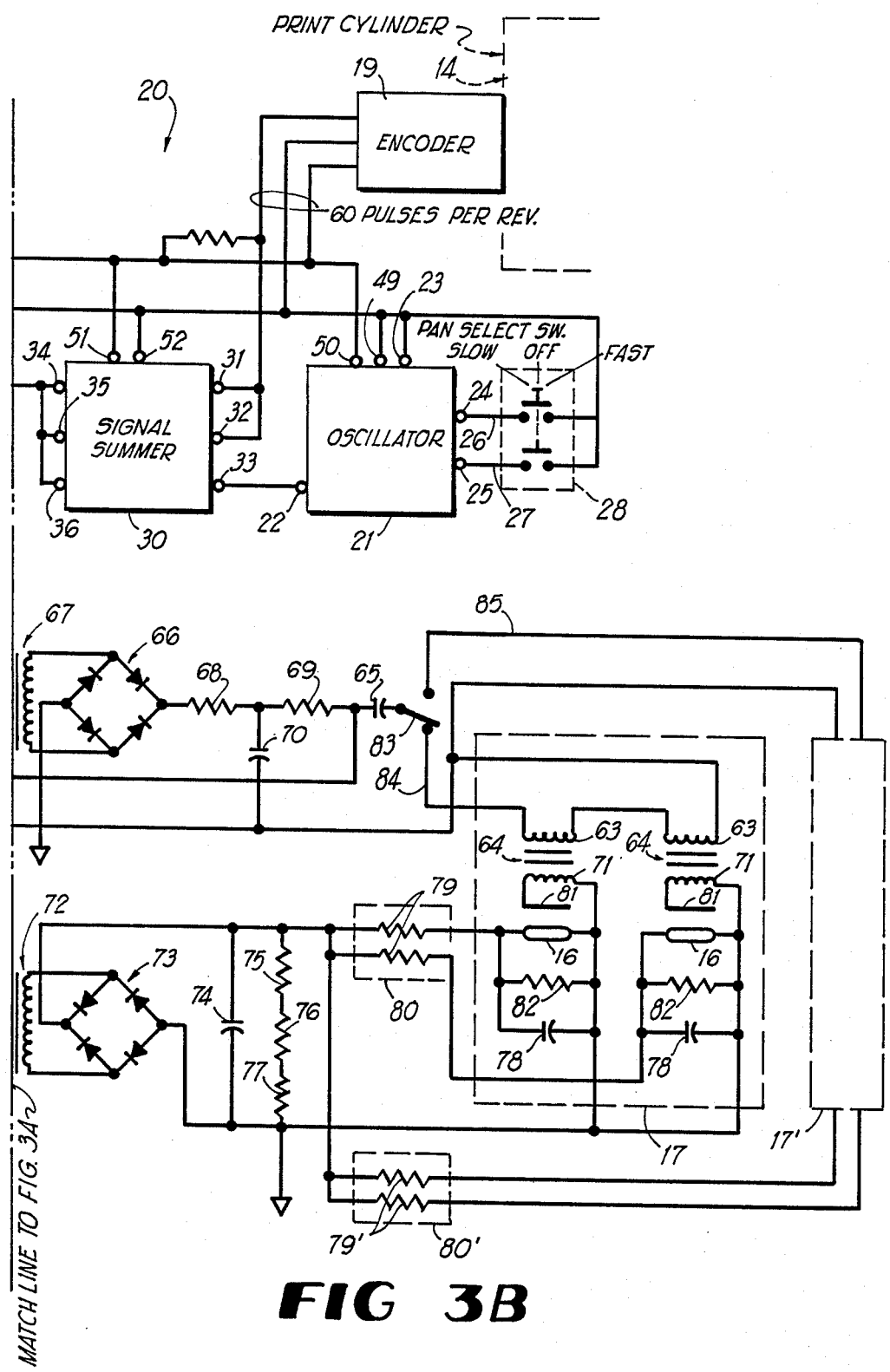

A pulse type encoder 19, such as an Encoder Products Company Accu-Coder Model 711 is directly coupled to the shaft of impression cylinder 14 via a timing belt and driven thereby in an exact 1:1 ratio rotationally. The encoder 19 (FIG. 1) produces 60 pulses per cylinder shaft revolution which are fed to a control circuit 20, the details of which are shown in FIG. 3. Referring now to FIG. 3, trigger pulses synchronized with the rotation of the impression cylinder 14 are generated to trigger the flash tubes 16 in the following manner.

A clock oscillator 21 is operable to provide a highly accurate fixed frequency output pulse train to terminal 22. The clock oscillator 21 is comprised of, for example, a model COS1 oscillator module manufactured by Red Lion Controls and comprises a precision timing device whose output frequency is determined by connecting shunts or wire jumpers provided between terminals 23, 24 and 25. These jumpers, shown by reference numerals 26 and 27, are selectively coupled to or disconnected from terminal 23 by means of a manually operated three position switch device 28 shown in FIGS. 1 and 2 located on the flash tube housing 17. The switch 28 accordingly is adapted to control the output frequency of the oscillator 21 to three fixed frequencies, one of which, i.e. the middle frequency, will operate to trigger the flash tubes in a stroboscopic manner to create the illusion of freezing the images 11 in a first mode of operation while the lower and higher frequencies will effect a slow and fast panning or scrolling of the images in a second mode of operation. Where the encoder 19 outputs 60 pulses per revolution of the impression cylinder 14, the middle frequency of the oscillator 21, for example, comprises one pulse per 0.1 minute which is subsequently divided, as will be shown, while the frequencies for the slow pan and fast pan comprise one pulse per 0.01 minutes and 0.001 minutes respectively. The change of frequency from the middle frequency creates the illusion of panning or scrolling the image, i.e. the longer the pulse interval, the slower the pan and vice versa.

In order to synchronize the strobe output with the encoder 19, the present invention employs a signal summer 30 which is operable to combine the count pulses applied to terminals 31, 32 and 33 into a common input and provide a signal synchronized output pulse train when output terminals 34, 35 and 36 are tied together. The signal summer 30, for example, comprises a model ACS anti-coincidence summer manufactured by Red Lion Controls. Accordingly, one input to the signal summer 30 comprises the oscillator output from terminal 22 which is coupled to input terminal 33 while the output of the encoder 19 is commonly coupled to input terminals 31 and 32.

The signal summer output appearing at terminals 34, 35, 36 is next coupled to a pulse divider circuit 38 which comprises a preset counter which is controlled in accordance with a six position selector switch 40 connected thereto. The counter 38 is comprised of, for example, a model SCP-4 presettable counter manufactured by Red Lion Controls. This circuit module additionally includes an internal power supply, not shown, which is operable to provide a +12 VDC output across terminals 41 and 42 upon the application of an AC primary power input coupled across terminals 43 and 44. Further, as shown, terminals 43 and 44 are connected to 110 VAC applied to terminals 45 and 46 via a two-pole, two-position ON/OFF switch 47 and a power circuit breaker 48. The +12 VDC supply potential appearing across terminals 41 and 42 of the pulse divider 38, moreover, are utilized to power the clock oscillator 21 and the signal summer 30 by being coupled across terminals 49 and 50 and 51 and 52, respectively.

The position of the selector switch 40 determines the pulse repetition rate division factor wherein, for example, with the position of the selector switch set at "1", the counter 38 provides only one pulse per cylinder revolution of the impression cylinder 14 at output terminal 53 in order to provide but one visually stationary row of images 11. However, two three, four, five or six pulses per shaft revolution can be provided by a corresponding setting of the selector switch 40 to provide a corresponding number of image rows which appear fixed to the eye.

Next, the divided pulse output appearing at terminal 53 of the pulse divider 38 is coupled to input terminal 54 of a pulse driver amplifier 55 comprised of, for example, a model PJE1-2HP driver module manufactured by the Parametrics Company. The driver module 55 further includes an internal DC power supply, not shown, and accordingly, the 110 VAC power applied to terminals 45 and 46 is applied to terminals 56 and 57 via a transformer 58. The driver amplifier 58 operates to produce amplified trigger pulses for triggering flash lamps 16 at terminal 59. Further as shown, terminal 60 is connected to ground potential along with terminal 61 which is associated with the AC power line terminals 45 and 46. Terminal 62 is connected to a common DC return path coincident with terminal 42 of the pulse divider 38. The pulses appearing at output terminal 59 of the pulse driver module 55 are coupled to the series connected primary windings 63 of one or more trigger transformers 64 through a capacitor 65 which is also connected to a high voltage DC bias potential (600 volts) which is generated by a full wave diode bridge rectifier 66 connected to a transformer 67 and is coupled across the AC line potential in the same fashion as transformer 58. The 600 volt DC bias potential is further filtered by means of a pair of fixed resistors 68 and 69 and a fixed capacitor 70. When trigger pulses are applied to the primary windings 63 of the trigger transformer 64, the secondary windings 71 operate to produce 20 KV pulses which fire to flash tubes 16 in synchronism with the rotation of the impression cylinder 14.

In addition to the pulsing circuitry, the flash tubes 16 also require for their operation a high voltage power supply which provides a high voltage DC potential in the order of 2000 VDC. The high voltage power supply is comprised of the high voltage power transformer 72 whose primary winding is coupled across the AC line potential following the ON/OFF switch 47 and the circuit breaker 48. The secondary winding of the high power transformer 72 is connected to a full wave diode bridge rectifier network 73 across which is coupled an RC filter network comprised of the parallel combination of a fixed capacitor 74 and three series connected resistors 75, 76 and 77. The 2000 VDC high voltage potential operates to charge respective high voltage storage capacitors 78 located in the flash tube housing 17 through respective high powered resistors 79 located in a separate resistor box 80. The capacitors 78 operate to discharge through the flash tubes 16 to produce each strobe flash when a trigger pulse from the driver circuit module 55 is applied to the respective trigger electrodes 81 via the transformers 64. The capacitors 78 are recharged through the respective resistors 82 in the interval between flashes.

Figure 2:
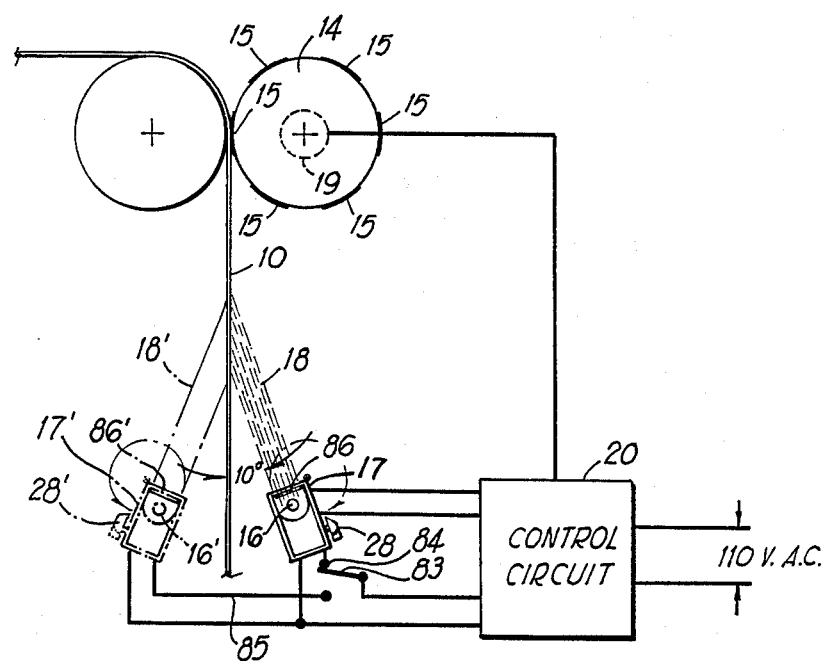
FIG. 2 is a partly schematic side elevation of the invention.

As shown, the embodiment schematically illustrated in FIG. 3 includes a flash tube housing 17 having two flash tubes 16 located therein. In the event that inspection of the rear surface of the web is desired, a second flash tube housing 17' is required, and is shown in FIGS. 1 and 2 located behind the web 10 with respect to the operator 12. Its components, moreover, are the same as shown in FIG. 3 with respect to the tube housing 17. It also requires a separate resistors box 80' including resistors 79. For the extra tube housing 17', however, a two-pole, two-position switch 83 is shown connected between the capacitor 65 and the two circuit leads 84 and 85. Switch 83 in one position is operable to connect trigger pulses from the driver 55 to the respective trigger transformer 64 of the tube housing 17 via circuit lead 84 while the other position connects the same trigger pulses to the tube housing 17'. Both sides of the web are not illuminated simultaneously because to do so would "blind" the operator.

Thus what is provided by the arrangement described above is a strobe type of an inspection system which permits the operator to not only freeze the images 11 on the web 10, but also to pan or scroll the images at two different rates. Regardless of the mode selected, however, the image remains synchronized with the printing impression. In normal operation, the operator can leave the web strobe in the fixed image mode or in the slow pan mode. In the slow pan mode, the operator can casually, at press side or while performing other tasks in the immediate area, inspect the web for defects. When a defect is received, the operator can then switch to the fast pan mode to locate the questionable print quality. Once located, setting the selector switch to lock freezes the image for closer inspection.

When desirable, the inspection of short repeats, such as printed stamps, can be achieved by positioning the lamp housings 17 and 17' at an angle 90° relative to the direction of the web. By setting the image control switch 40 to "1", one would be able to inspect the entire impression image.

Also high speed horizontal stream inspection e.g. the continuous inspection of the gluing of cartons can be achieved using this invention. Frequently folding defects occur when the gluing machine operates at high speeds. The use of prior art apparatus such as video equipment has a very limited field of view. The subject apparatus can illuminate a lengthened line of sight with the pan function providing the "search" function. Another horizontal stream that can be inspected could be the progressive cutting of parts on a punch press. In the metal parts industry this stream of punched parts is called a carrier web.

It has also been discovered that placement of light filters, shown with reference numerals 86 and 86' placed at the opening of the flash tube housings 17 and 17', where the strobe beams 18 and 18' are emitted, markedly enhances the use of the apparatus. The filters 86 and 86', moreover, are hinge mounted on the housings 17 and 17' so that they can be used or not used as desired. The filtered light permits the discernment of print features which are not readily visible under white light conditions. For example, using a subtractive color separation technique, i.e., magenta, cyan and yellow filters, aids in checking the colorimitry of the unfiltered color. Similarly, use of an ultra-violet filter (black light) will highlight luminous trace elements.

Having thus shown and described what is at present considered to be the preferred embodiment of the invention, the same has been made by way of illustration and not limitation. Accordingly, all modifications, alterations and changes coming within the spirit and scope of the invention as defined in the appended claims are meant to be included.

I claim:

1. A method of inspecting a high speed printed web having spaced repetitive impressions printed thereon, comprising the steps of:
   translating said web past a flash tube assembly including at least one flash tube adapted to be stroboscopically excited;
   generating trigger pulses which in a first mode of operation are synchronized at a frequency determined by the movement of the web, and in a second mode of operation continue to be synchronized with the web but are periodically advanced in a controlled manner;
   exciting said at least one flash tube with the trigger pulses to produce light flashes; and
   directing said light flashes to one surface of the web whereby a stroboscopic effect is produced, such that in said first mode of operation a virtually stationary or locked image of the impression on the web is produced and in said second mode of operation a panned or scrolled image of the impression on the web is produced which is incrementally advanced but which remains synchronized to the web between said advancements.

2. The method of claim 1, wherein said step of generating trigger pulses further comprises, in said second mode of operation, selectively choosing the period of advancement, so as to produce a panned or scrolled image of the web having predetermined different rates of movement.

3. The method of claim 1 and additionally including the step of selectively varying the synchronization of the trigger pulses with the web to cause the number of impressions stroboscopically produced on the web to correspond to the number of spaced repetitive impressions printed on the web.

4. The method of claim 1 and additionally including the step of selectively filtering the flashes of light directed to the surface of the web.

5. The method of claim 1 and wherein said step of directing light flashes includes directing said light flashes to either surface of the web at an oblique angle relative to the path of movement of the web.

6. The method of claim 1 and wherein said step of directing light flashes includes directing said light flashes to either surface of the web at a right angle relative to the path of movement of the web.

7. The method of claim 1 and additionally including the step of comparing the impressions visible of the stroboscopic images of the web against a standard.

8. The method of claim 7 wherein said step of comparing is carried out in said first mode of operation.

9. Apparatus for visually inspecting a high speed printed web being delivered from a printing press having an impression cylinder provided on its outer surface with selectively spaced impression elements, comprising;
   at least one linear flash tube extending transversely across one surface of the printed web undergoing inspection; means for directing light from said flash tube to said one surface;
   means for exciting said flash tube upon the application of triggering pulses;
   means coupled to said impression cylinder for generating a first train of pulse signals;
   means for generating a second train of pulse signals of at least one frequency;
   means responsive to said first and second train of pulses for generating a train of trigger pulses wherein in a first mode one trigger pulse is generated for each occurrence of a predetermined total of pulses from said first train of pulse signals, and in a second mode one trigger pulse is generated for each occurence of the same predetermined total of pulses from said first and second train of pulse signals; and means for conditioning and coupling said trigger pulses to said means for exciting said flash tube;

wherein said first mode of operation stroboscopically produces a virtually stationary image of the impressions printed on the web and said second mode of operation stroboscopically produces a visually perceptible moving image of the impressions printed on the web in a first controlled rate of movement to provide panning or scrolling of said impressions.

10. The apparatus of claim 9, wherein said means for generating said second train of pulse signals includes means for generating another frequency operable in said second mode of operation to produce a moving image of impressions printed on the web in a second controlled rate of movement to also provide panning or scrolling of said impressions.

11. The apparatus of claim 10 wherein said first rate of movement is slower than said second rate of movement.

12. The apparatus of claim 9 wherein said means for generating said first train of pulses comprises encoder means coupled to the shaft of the impression cylinder and being operable to generate output pulse signals of a fixed number of pulses per revolution of the impression cylinder.

13. The apparatus of claim 12 and wherein said means for generating said second train of pulse signals comprises a clock oscillator including means for varying the frequency of the output signals thereof, and additionally including user operable switch means coupled to said means for varying the frequency for selectively providing either said first or second frequency of said output signals.

14. The apparatus of claim 13 and wherein said means for generating said train of trigger pulses comprises means for synchronizing said output signals of said clock oscillator with the output signals of said encoder means, and pulse frequency divider means coupled to said synchronizing means for providing at least one trigger pulse per revolution of said impression cylinder.

15. The apparatus of claim 14 wherein said means for generating said train of trigger pulses additionally include trigger pulse amplification and driver means coupled between said frequency divider means and said flash tube excitation means.

16. The apparatus of claim 9 and additionally including light filter means of a predetermined type located between the web and said light directing means.

17. The apparatus of claim 9, wherein said light directing means is oriented with the respect to said web for directing light to the surface of said web at an oblique angle for reducing glare.

18. The apparatus of claim 9, wherein said light directing means is oriented with respect to said web for directing light to the surface of said web at substantially a right angle for facilitating the inspection of short repeats on the web.

19. The apparatus of claim 9 and additionally including at least one additional flash tube extending transversely across the opposite surface of the printed web for providing inspection thereof, and a second means for mounting said at least one additional flash tube therein for directing light to said opposite surface.

* * * * *